United States Patent

[11] 3,629,041

[72] Inventor Samuel M. Shobert
 17760 Dragoon Trail, Mishawaka, Ind. 46544
[21] Appl. No. 756,675
[22] Filed Aug. 30, 1968
[45] Patented Dec. 21, 1971

[54] METHOD FOR MAKING A TOBOGGAN
 8 Claims, 8 Drawing Figs.
[52] U.S. Cl. .................................... 156/289,
 156/242, 156/296, 156/323, 156/381, 280/18
[51] Int. Cl. .................................... B32b 31/20,
 B32b 31/18
[50] Field of Search .................................... 156/289,
 90, 323, 196, 212, 242, 272, 296, 232, 180, 201,
 381; 161/406; 117/126; 280/18

[56] References Cited
UNITED STATES PATENTS

| | | | |
|---|---|---|---|
| 2,741,294 | 4/1956 | Pancherz .................... | 156/381 X |
| 3,185,605 | 5/1965 | Osborne et al. ................ | 156/323 X |
| 3,244,570 | 4/1966 | Boggs .......................... | 117/126 GR X |
| 3,303,081 | 2/1967 | Michaelson et al. .......... | 156/289 |
| 2,822,575 | 2/1968 | Imbert et al. ................ | 156/289 X |

OTHER REFERENCES
The Condensed Chemical Dictionary, Fifth Edition, 1956, pp. 746.

Primary Examiner—Carl D. Quarforth
Assistant Examiner—E. E. Lehmann
Attorney—Hood, Gust, Irish & Lundy ABSTRACT: A toboggan having a self-supporting, elongated sheetlike member of hardened and cured resin material reinforced with a plurality of sheetlike layers of porous and flexible cloth material of woven fibers. In a specific embodiment, five such layers are used. The outer two layers are of duck material and the inner three layers are of woven glass fiber material. This member is clamped between two pairs of elongated strips which are positioned adjacent to the longitudinally extending peripheral boundaries of said member. The method of the invention comprises the steps of wetting a predetermined number of strands of reinforcing material with the resin, urging the strands together and the resin into the interstitial spaces of said sheets and to control the quantity of resin on the strands, molding the strands to a desired shape, partially curing the resin, cutting the article in the partially cured state to the desired shape, and completely curing the resin. The molding partially curing steps in one specific embodiment includes placing of the strands between two sheets of flexible material which are impervious to the resin so as to enclose the article in this impervious material. One such material is polyethylene terephthalate. The article is then partially cured by simultaneously applying heat and pressure to the article. This application of heat and pressure to the article can be done by pressing the article with a conventional iron or pressing machine. The apparatus of the invention comprises a mold member of rigid material having a mold surface and a peripheral surface on opposite sides of the mold surface. A flexible mold member is placed over the rigid mold member so as to overlie both the mold surface and the peripheral surfaces. The rigid mold member includes means for holding the flexible mold member to its peripheral surface.

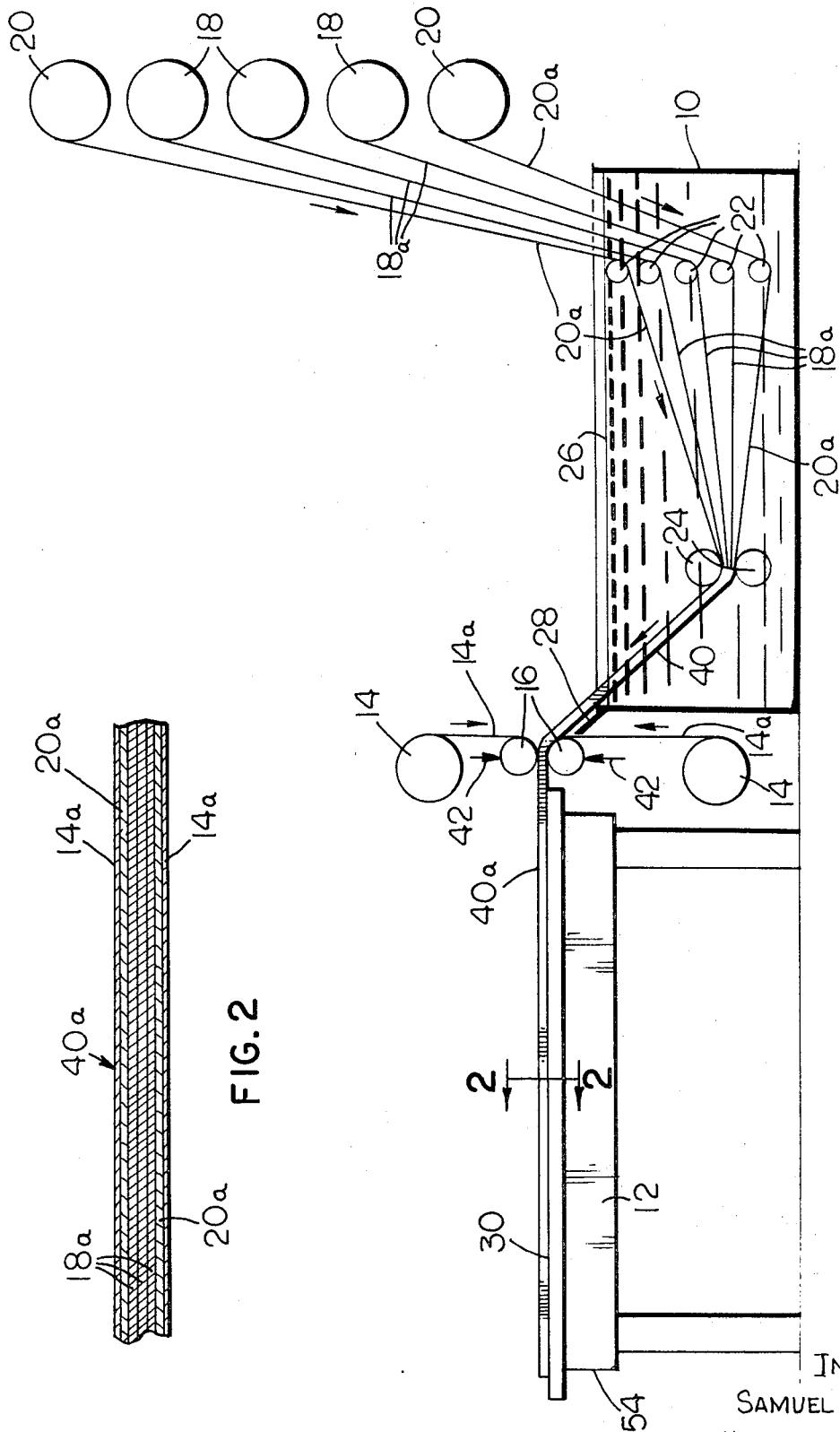

INVENTOR
SAMUEL M. SHOBERT
by Hood, Gust, Irish & Lundy
Attorneys

INVENTOR
SAMUEL M. SHOBERT
by Hood, Gust, Irish & Lundy
Attorneys 3,629,041

METHOD FOR MAKING A TOBOGGAN

BACKGROUND

1. Field of The Invention

This invention generally relates to toboggans and method and apparatus of fabricating fiber reinforced resinous sheetlike articles, and more particularly to a toboggan and a method and apparatus for fabricating the same.

2. Description of the Prior Art

Conventionally, toboggans are made of wood. Fiber reinforced resinous materials have well-known properties. It is apparent from these properties that an improved toboggan could be made from a sheet of fiber-reinforced resin material. However, at least four problems were encountered in fabricating a toboggan of these materials when conventional techniques were used. The first problem encountered was that the surfaces of the fiber-reinforced resinous sheet and the runners fabricated in accordance with conventional techniques was not smooth. Since the bottom surfaces of this sheet and the bottom runners when used in a toboggan are in contact with the snow during use, any roughness of these bottom surfaces results in slowing the toboggan down, and thus, is not desired. Conventional toboggans made of wood have bottom surfaces which are smoothly finished and highly polished. Thus, it is desirable to provide a method of fabricating sheets of fiber-reinforced resin material which have surfaces comparing in smoothness and polish to the bottom surfaces of conventional toboggans.

Second, prior attempts to manufacture runners from wood resulted in a substantial number of runners being broken or otherwise rendered unusable during the manufacturing process. For this reason, as high as 40 percent of the runners manufactured had to be discarded. Therefore, it was desirable to provide both an improved method and apparatus for manufacturing runners. Preferably, this apparatus and method results in the bottom runners having a bottom surface which is smoothly finished and highly polished for the reasons abovementioned.

Third, prior attempts to secure the runners and other toboggan accessories to sheets of fiber-reinforced resin material resulted in a failure of the sheet. For this reason, the attachment of these accessories to the sheets had to be modified.

Fourth, the manufacturing cost of the sheets used in the manufacture of the toboggans had to be made competitive with the manufacturing cost of conventional toboggans.

The toboggan and method and apparatus for fabricating fiber-reinforced resinous sheetlike articles disclosed and claimed herein are the solutions to these problems.

SUMMARY OF THE INVENTION

In the broader aspects of the invention, a toboggan is provided having an elongated sheetlike member with opposite ends. One end of said member is upwardly curved thereby to form a toboggan front end. The member is made of hardened and cured resinous material with reinforcement embedded therein. The reinforcement includes a plurality of sheetlike layers of porous and flexible cloth material of woven fibers. The layers are superposed and submerged in the resin, the resin fills the interstities between the fibers of the material. Two pair of elongated strips are provided. The strips are positioned adjacent to the longitudinal boundaries of the member to extend longitudinally thereof. Each strip of one pair is secured to a strip of the other pair. The member is clamped between the secured strips.

The invention in its broader aspects also provides a method for fabricating fiber-reinforced resinous articles comprising the steps of wetting a plurality of strands of reinforcing material with a liquid hardenable resin, urging the strands together and the resin into the interstitial spaces of the strands and to control the quantity of resin on the strands, molding the strands to a desired shape, partially curing the resin, cutting the article to a desired shape and size, and completely curing the resin.

The invention in its broader aspects also provides an apparatus comprising a mole member of rigid material having at least one mold surface and peripheral surfaces on opposite sides thereof.

It is accordingly a primary object of this invention to provide an improved toboggan.

It is also a primary object of the invention to provide an improved method and apparatus for fabricating fiber-reinforced articles of resin material.

Another object of the invention is to provide an improved toboggan from a sheetlike member of fiber-reinforced resinous material.

Another object is to provide an improved toboggan from a sheet of fiber-reinforced resinous material which has a bottom surface of the smoothness and polish of a conventional toboggan.

Yet another object of this invention is to provide a method and apparatus for fabricating articles of fiber-reinforced resinous material having surfaces which have the smoothness and polish of highly finished wood products at a cost competitive therewith.

Yet another object of this invention is to provide a method and apparatus of fabricating fiber-reinforced resinous articles which includes a unique method of shaping the article as desired.

Yet another object of this invention is to provide a method and apparatus for fabricating fiber-reinforced toboggan runners having bottom surfaces which have the smoothness and polish of highly finished wood products at a cost competitive therewith.

A further object of this invention is to provide an improved toboggan from fiber-reinforced resinous materials which has the durability of conventional toboggans.

BRIEF DESCRIPTION OF THE DRAWINGS

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a diagrammatic side view, partially in cross section, of apparatus used in performing the method of the invention;

FIG. 2 is a fragmentary and cross-sectional view of the sheetlike article fabricated by the method of the invention;

DESCRIPTION OF THE PREFERRED EMBODIMENT

Figure 3:
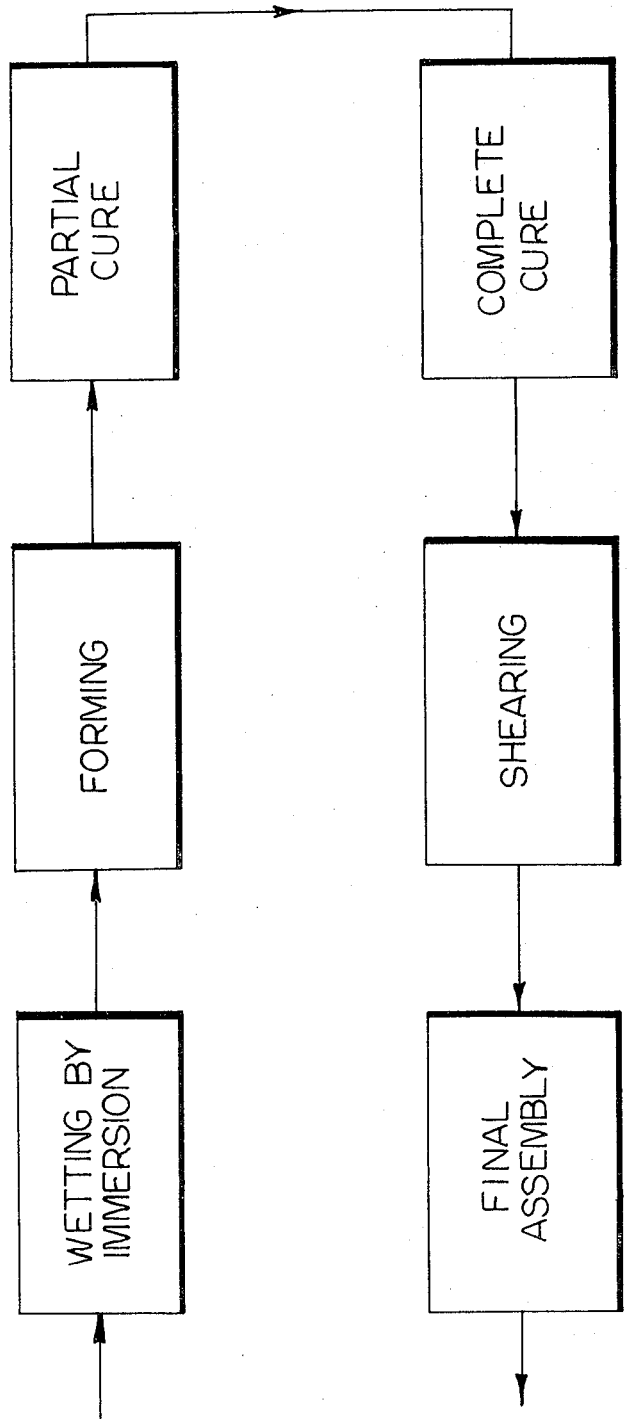
FIG. 3 is a diagrammatic illustration of the method of the invention.

Referring to the drawings, and more specifically to FIGS. 1 through 4, there is shown an apparatus for performing the method of the invention. The apparatus shown in FIG. 1 comprises a tank 10 and a table 12 positioned end to end and adjacent to each other. Between the tank 10 and table 12 are positioned two storage rolls 14 and two wiping rolls 16. Adjacent to the opposite end of the tank emptied are positioned three storage washed 18 and two storage rolls 20. The wiping rolls 16 are positioned in spaced apart relation and adjacent to the end of the table 12. Means (not shown) is provided in combination with the rolls 16 to adjust the spacing of the rolls 16. Spaced apart from the rolls 16 and on opposite sides of the rolls 16 are the two storage rolls 14. Each of the rolls 14 an 16 has a substantially horizontal axis extending in the same direction. Further, the rolls 16 are positioned such that one is generally above the other, and the rolls 14 are positioned such that generally one roll 14 is above the two rolls 16 and the other roll 14 is beneath the two rolls 16.

Similarly, each of the rolls 18 are positioned one above the other. Each of the rolls 18 has an axis which is substantially horizontal. The rolls 20 are positioned such that one of the rolls 20 is above the three rolls 18 and one of the rolls 20 is below the three rolls 18. Each of the rolls 20 also has an axis which is substantially horizontal. The axes of the rolls 18, 20 are substantially parallel to each other and extend in the same direction. Further, each of the rolls 18 and 20 are spaced apart from each other.

Within the tank 10 there are positioned five spaced-apart guide rolls 22. Rolls 22 are generally positioned one above the other. Each of the rolls 22 has an axis which is substantially horizontal and extends in the same direction as rolls 18. 20. Rolls 22 are positioned adjacent the rolls 18 and 20.

Also positioned within the tank 10 are two guiding rolls 24. Guiding rolls 24 are also spaced apart and positioned generally one above the other. Guiding rolls 24 also have generally horizontal axes which extend in the same direction as rolls 18, 20. Guiding rolls 24 are positioned adjacent to but spaced from the end of the tank 10 most adjacent rolls 14 and 16.

Tank 10 is filled with liquid resin. The liquid level is maintained above the rollers 22 and 24, for example, at a level marked by the reference numeral 26. Tank 10 is also equipped with a lip 28 which extends from the tank 10 toward the bottommost roll 16. The precise purpose of lip 28 will be mentioned hereinafter.

Table 12 has an upwardly facing surface 30. This upwardly facing surface 30 is positioned with respect to the bottommost roll 16 such that the surface 30 and the uppermost peripheral portion of the roll 16 are generally in the same plane.

Figure 4:
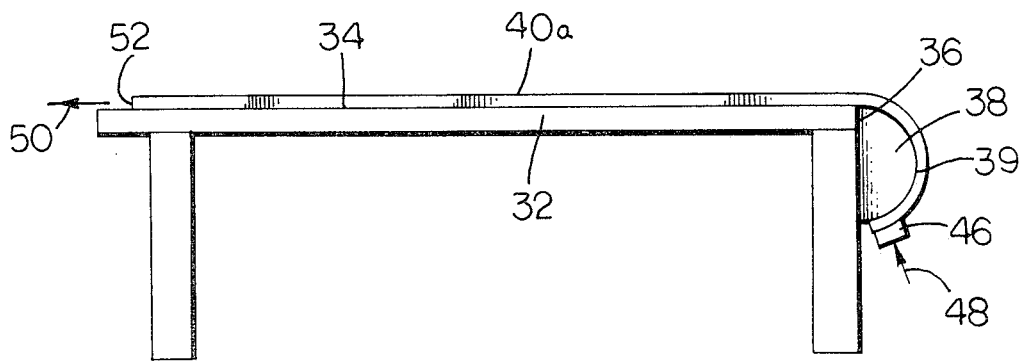
FIG. 4 is a side view of additional apparatus used in the performance of the method of the invention

Referring now to FIG. 4, additional apparatus used in the performance of the method of the invention is shown. This apparatus comprises a table 32 having a flat upwardly facing surface 34. At one end 36 of the table 32 there is secured to the table 32 an extension 38. Extension 38 has a part cylindrical surface 40, which extends from the surface 76' of the table 32 downwardly. Surface 40 forms a continuation of the surface 34 of the table 32.

In the performance of the method of this invention, storage rolls 18 are provided with woven glass fiber material. Storage rolls 20 are provided with duck material. Storage rolls 14 are provided with sheet material which is impervious to the resin being used. In the specific embodiment contemplated this material is polyethylene terephthalate sheet material such as that sold under the trademark MYLAR by E. I. DuPont De Nemours Co. and the resin is a conventional heat-hardenable epoxy or polyester resin.

The duck material of the topmost roll 20 is threaded under the topmost guiding roll 22, between the guiding rolls 24, and between the wiping rolls 16. Similarly, the duck material of the bottommost roll 20 is threatened beneath the bottommost guiding roll 22, between the guiding rolls 24, and between the wiping rolls 16.

The fiber glass material on the rolls 18 are threaded beneath the remaining three guiding rolls 22 and between the duck material so as to be positioned between both the rolls 24 and the rolls 16.

The material on the rolls 14 is threaded between the rolls 16 so as to overlay the duck material.

Thus, as the various layers of material pass through the rolls of the tank 10, three layers of glass fiber material 18a are positioned between two layers of duck material 20a. These sheets of layers of material are superposed by the positioning of the rolls 18, 20, 22. While still within the tank 10, these layers 18a and 20a are urged together by means of the rolls 24 such that each of the sheets or layers are in contact with the next adjacent sheets or layers as they exit from the rolls 24. The composite sheetlike article emerges from the tank 10 and passes between the rolls 16. As the article 40 passes between the rolls 16, a sheet or layer of material 14a of the type above-mentioned, is positioned both over and under the article 40. The spacing between the rolls 16 is adjusted to further urge the sheets 14a, 18a, and 20a together and to control and amount of resin used. Substantial force is exerted on the article 40a by the rolls 16 so as to wipe from the article 40a any excess resin and to urge the resin into the interstitial spaces of the sheets or layers of the article 40a. The excess resin drips onto the lip 28 and back into the tank 10. The force exerted upon the article 40a by the rolls 16 is indicated by the arrows 42.

Each of the rolls 18, 20, 22, 24 can be substantially the same longitudinal length and each of the materials 20a and 18a can have substantially the same width. When the materials 18a and 20a are superposed, the longitudinal boundaries of the materials 18a and 20each generally coincide with each other and form the longitudinal boundaries of the article 40. However, the width of the material 14a must be larger than the width of the materials 18a and 20a such that when the material 14a positioned both over and under the article 40, the longitudinal boundaries of the material 14a will be spaced outwardly from the longitudinal boundaries of the article 40 and the material 14a will enclose the article 40.

3. reference to FIG. 4, the article 40a is positioned upon the upwardly facing surface 34 of the table 32 and the cylindrical surface 39 of the extension 38. A clamp 46 is provided to hold one end of the article 40a fast to the surface 39 of the table extension 38. The force exerted upon the article 40a by the clamp 46 is indicated by the arrow 48. The article 40a is then stretched along the upwardly facing surface 34 to table 32 as indicated by the arrow 50 and cut at 52. The article 40ais then pressed in this position. Either a conventional flat iron or a more elaborate pressing machine can be used. This pressing applies to the article 40a both heat and pressure such that the resin of the article 40a is partially cured. The partially cured article 40a is self-supporting and will retain its shape such that it can be picked up and carried from the table 32 and placed in an oven (not shown).

It can readily be seen that the material 14a acts as a mold or form. This material, being very smooth, is in direct contact with the surface of the article 40; and thus, the resin of the article 40 conforms to the surface of the material 14a. This results in the surface of the article 40 becoming very smooth and highly polished so as to favorably compare with a highly polished and finished wood surface.

In a specific embodiment, the operation described hereinabove as taking place upon the surface of the table 32 can also be performed upon the surface 30 of the table 12. In this embodiment, the table extension 38 would be attached to end 54 of the table 12.

The article 40a, in the aforementioned partially cured state is then placed within an oven as above-mentioned. This oven is maintained from about 300° to about 350° F. when conventional polyester and epoxy resins are used in the tank 10. In the same embodiment, the article 40a is left in the oven for about 15 or 20 minutes.

The article 40a is then removed from the oven. The material 14a is then stripped from the article 40a and discarded. In this stage, the article 40 is still self-supporting and will retain its shape upon being moved from place to place. Further, however, the article 40 has smooth and highly polished surfaces compared with the highly finished surfaces of a wood product.

The article 40 is now cut to shape. To form the sheet 40b which will be hereinafter mentioned as a part of the toboggan of this invention, the article 40 is sheared both longitudinally thereof and transversely thereof such that the article 40 has straight and parallel peripheral edges.

The article 40 is then replaced in the same oven as above-mentioned. The resin of the article 40 is then completely cured. In the embodiment above-mentioned at which the oven is held at a temperature from about 300° to about 350° F., this takes in about 3 to 4 hours.

Figure 5:
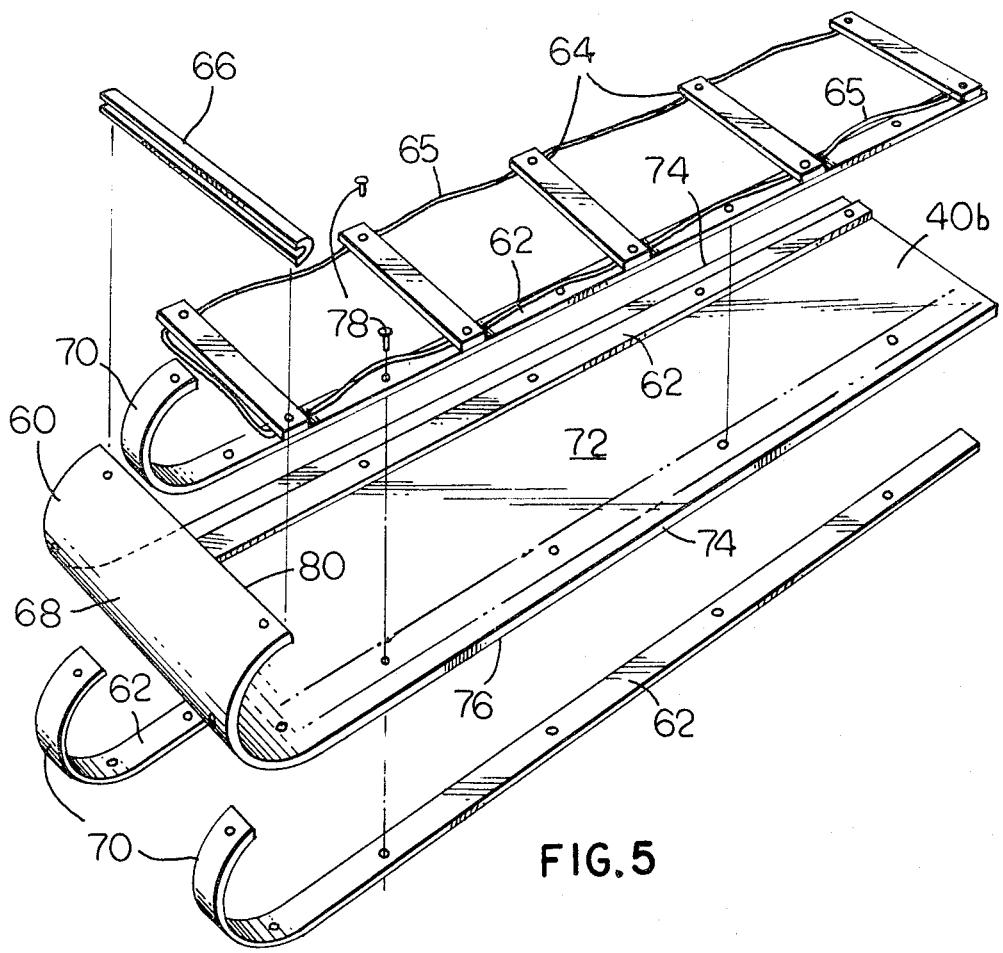
FIG. 5 is an exploded and perspective view of the improved toboggan of the invention.

Now referring to FIG. 5, there is shown one embodiment of the improved toboggan 60 of the invention. Toboggan 60 comprises a member 40b made in accordance with the above description, longitudinally extending strips 62, transversely extending strips 64, a length of rope 65, and an end strip 66. Member 40b and strips 62 are each upwardly curved at one end thereof. The end of the sheet 40b is upwardly curved so as to form a front toboggan-end 68. This end 68 is formed as above-described by the table extension 38. Each of the strips 62 are curved in a like manner. Specifically, each end 70 of the strips 62 is curved so as to have the same radius as the end 68 of the member 40b.

The strips 62 are provided in two pairs. One pair of the strips 62 is placed upon the upwardly facing surface 72 of the member 40b. These strips extend longitudinally of the member 40b and are adjacent to and parallel to the longitudinally extending edges 74 of the member 40b. The other pair of strips 62 are positioned to overlay the bottom surface 76 of the member 40b. These strips also extend longitudinally of the member 40b and are positioned adjacent to and generally parallel to the edges 74. Each of the strips 62 of this last-mentioned pair also lie directly beneath a strip 62 of the first-mentioned pair. The strips 62 are secured together. This in the specific embodiment illustrated in FIG. 5 is achieved by rivets 78. Holes (not shown) are drilled in member 40b and strips 62 for the rivets 78. This securance of the strips 62 together with the member 40b therebetween clamps the member 40b between the strips 62.

The end strip 66 is positioned on the end 80 of the member 40b. Strip 66 is secured to the member 40b and to the strips 62 by means of a suitable waterproof glue. The strips 64 are secured to the strips 62 of the first-mentioned pair by means of additional holes and rivets 78. These strips extend transversely of the member 40b and are spaced apart in a longitudinal direction of the member 40b. The rope 65 extends longitudinally of the strips 62 the entire length of each of the strips 62. In the specific embodiment illustrated in FIG. 5, the rope 65 is shown in a single length to extend longitudinally of both strips 62 and transversely thereof at 82 thereby to define a "U" shape. Rope 65 overlays the strips 62. The strips 64, adjacent to the opposite ends thereof, overlay the rope 65. Thus, when the strips 64 are secured to the strips 62 by the rivets 78 as above-mentioned, the rope 65 is clamped therebetween.

In a specific embodiment of the improved toboggan shown in FIG. 5, the strips 62 and 64 are made of wood. These strips are sanded, varnished or shellacked, and highly polished in accordance with prior art methods.

Figure 6:
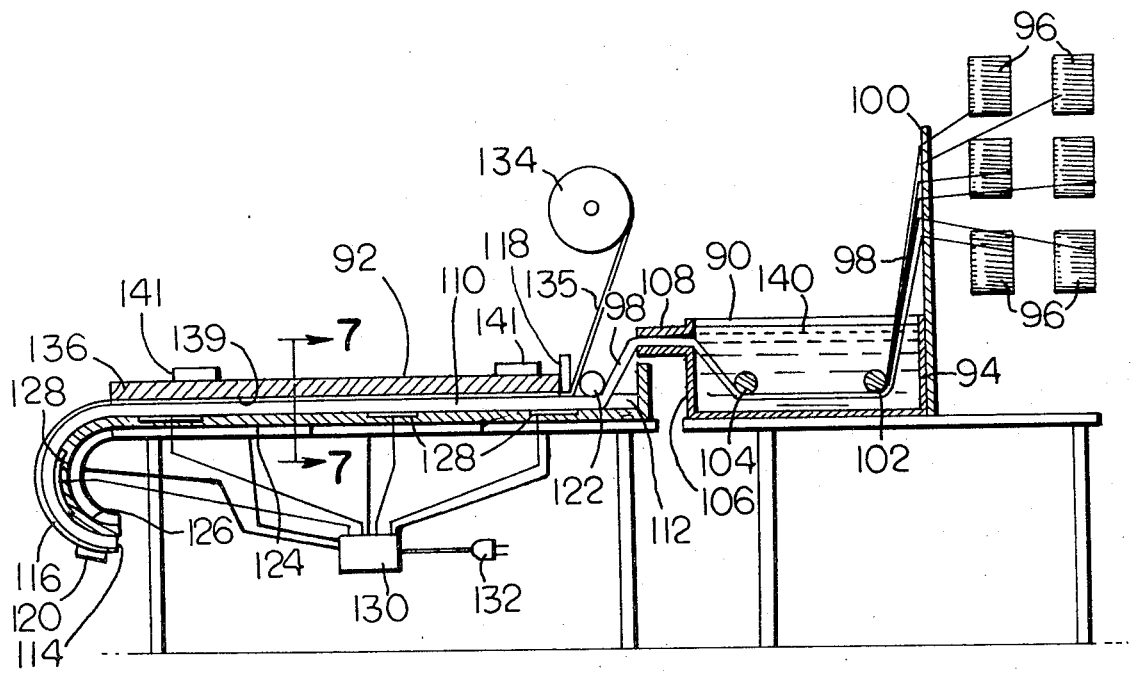
FIG. 6 is a diagrammatic side view, partially in cross section, of additional apparatus used in performing the method of the invention.

Now referring to FIG. 6, there is shown additional apparatus for performing the method of the invention, and more specifically, the method of the invention as it relates to fabricating the strips 62 above-mentioned from fiber glass reinforced resin material. This apparatus comprises a resin tank 90 and a mold generally referred to by the reference numeral 92. Positioned adjacent to one end 94 of the tank 90 are a plurality of rolls 96 having continuous strands 98 of glass fiber stored thereon. Upstanding from end 94 of tank 90 is sheetlike plate 100 having spaced apart holes therein. Tank 90 is elongated and extends from end 94 to end 106. In tank 90 there are positioned two guide rods 102 and 104. Guide rods 102 and 104 extend transversely of tank 90. Rod 102 is positioned adjacent end 94 and rod 104 is positioned adjacent end 106. Rods 102 and 104 are generally parallel to each other. Secured to the tank 90 at end 106 is an extruding die 108. Extruding die 108 has a bore extending therethrough which communicates with the interior of the tank 90.

The mold 92 comprises a rigid mold member 110. Rigid mold member 110 has an elongated mold cavity 111 extending between opposite ends 112 and 114. This mold cavity 111 in the specific embodiment illustrated in FIG. 6 has a bottom 113 and upstanding sidewalls 115 and a substantially rectangular cross-sectional shape. (See FIG. 7). Adjacent to end 112, the bottom of the mold cavity of the mold member 110 is generally planar. Adjacent to end 114, the bottom of the mold cavity is generally cylindrical. This cylindrical portion is referred to by the reference numeral 116. Attached to the mold member 110 are two clamping devices 118 and 120. The purpose of these devices will be explained hereafter. Also attached to the mold member 110 is a guide rod 122. This guide rod is positioned adjacent end 112 and extends transversely of mold cavity 111. Guide rod 122, for all practical purposes, can be substantially identical to guide rods 102 and 104.

Mold member 110 is provided with heating elements, temperature-sensing devices, and a thermostat. Referring to FIG. 6, there are shown a plurality of heating elements 124, 126 secured to the bottom of the mold member 110. It should be noted that a heating element 126 is secured to the bottom of portion 116 of the mold member 110. Attached to the bottom and sides of the mold member 110 are a plurality of temperature sensing devices 128. Temperature sensing devices 128 and the heat elements 124, 126 are each connected in a conventional manner to a thermostat 130. The thermostat is provided with a power source indicated by the reference numeral 132. The heating elements 124, 126, the temperature sensing devices 128 and the thermostat 130, including the manner in which they are connected are conventional in all respects.

Mold 92 also includes a storage roll 134 and a rigid mold member 136. Roll 134 is positioned generally above end 112 of the mold member 110. Mold member 136 is rigid and is appropriately sized to overlay the portion of the mold member 110 adjacent end 112 to close the mold cavity 111 therein. Mold member 110 is provided with upstanding peripheral surfaces 138 which extend longitudinally of the mold cavity 111 the entire length of the mold cavity 111 on opposite sides thereof. (See FIG. 7). corresponds The peripheral surfaces 138 are spaced from the bottom 113 of the mold cavity 111 a distance equal to the desired dimension of the article to be molded in a direction perpendicular to the bottom 113. This distance corresponds to the width of the sides 115 of the mold cavity 111.

Mold member 136 is provided with a surface 139 which is shaped generally to conform to the surfaces 138. By this means, the mold member 136 is adapted to be placed upon the mold member 110 with the surfaces 138 and 139 in intimate contact with each other along the entire length of the member 136. Member 110 is provided with clamps 140 by which the member 136 can be clamped to the member 110 thereby to form a seal between the surfaces 138, 139 to enclose the mold cavity 111 along the entire length of the member 136. As can be readily understood from FIG. 6, the mold cavity 111, however, is not closed adjacent end 112 nor over the curved portion 116 of the mold member 110.

Figure 7:
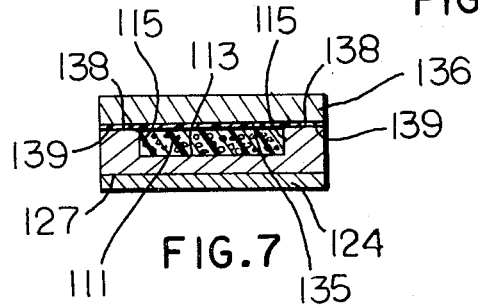
FIG. 7 is a cross-sectional view of the mold illustrated in FIG. 6 taken generally along the section line 7—7.

In the performance of the method of this invention utilizing the apparatus illustrated in FIGS. 6 and 7, tank 90 is filled with resin. In a specific embodiment, this resin can be conventional heat hardenable epoxy or polyester resin. The resin level within the tank 90 is maintained such that the resin covers the guide rods 102 and 104 and the bore of the extruding die 108.

The strands 98 of the storage rolls 96 are threaded through the openings in plate 100. Since these openings are spaced apart, the strands 98 are maintained in spaced-apart relation by the plate 100 thereby maintaining the strands 98 free from entanglements and facilitating the drawing of the strands 98 from the rolls 96 in the manner hereinafter described. The strands 98 are then threaded beneath the guide rods 102 and 104 and through the bore of the extruding die 108. Thus, the strands 98 pass through the resin contained within the tank 90.

In this manner, the strands 98 are wet with resin. The bore within the extruding die 100 is carefully chosen so as to compact the strands 98 together and to control the amount of resin on the strands. Thus, the bore of the extruding die 108 is made to a predetermined size. As the strands 98 leave the extruding die 108 they are thoroughly impregnated and saturated with liquid resin. The extruding die 108 also wipes from the strands 98 any excess resin.

Storage roll 134 is provided with flexible sheet material which is impervious to the resin being used. In the specific embodiment contemplated, this material is polyethylene terephthalate sheet material 135 such as that above-identified. Sheet material 135 and the strands 98 pulled from the storage rolls 96, 134.

Strands 98, wet with resin, are threaded beneath the guide rod 122 and are positioned within the mold cavity 111. Sheet material 135 is laid on the surfaces 138 of the mold member 110. Both the sheet material 135 and the strands 98 are clamped to the mold member 110 adjacent to end 114 by the clamp 120. Both the strands 98 and the sheet material 135 are then placed in tension and similarly clamped to the mold member 110 adjacent end 112 by the clamp 118. The material 135 is provided in a width which is larger than the width of the mold cavity 111 and is of sufficient width to overlay both the bottom 113 of the mold cavity 111 and the surfaces 138 of the mold member 110. When placed in tension, the sheet material 135 conforms to the surfaces 138 and encloses the mold cavity 111 along the entire length thereof.

The strands 98, wet with resin, fill the mold cavity 111. The resin within the mold cavity 111 conforms to the shape of the mold cavity. The sheet material 135 exerts sufficient force upon the strands and resin within the mold cavity 111 to hold the strands and resin in the cavity 111. Thus, sheet 135 is a part of the mold 92 and defines with mold member 110 the mold cavity 111.

Member 136 is then placed in position as above-described. The peripheral portions of sheet 135 are between the mold members 136 and 110. Mold member 136 is clamped to the mold member 110 by means of the clamps 140. Sheet 135 thus is clamped between mold members 110 and 136.

The mold member 110 is now heated. The mold member 110 is maintained at a temperature of from about 300° F. to about 350° F. for approximately 3 to 5 hours. This completely cures the resin within the mold cavity 111. After the resin is cured, the hardened resin and strands 98 are removed from the mold cavity 111 and the sheet 135 is discarded.

In the specific embodiment illustrated, the mold 92 is provided to form the strips 62 above-mentioned of reinforced resin material. The mold cavity 111 in cross section measures 1 ¾ inches by $\theta$ inch. The mold cavity 111 is from about 7 to about 10 foot long and has a portion 116 which is about from about 1 to about 2 foot long. In this same specific embodiment, strands 98 are strands of 60 end glass fiber material. From about 60 to about 70 strands 98 are used in fabricating the strips 62 as above-described. The number of strands 98 actually used are varied between the aforementioned limits depending upon the consistency of the resin within the tank 90. For example, about 60 strands 98 are used when the resin is extremely thick. Similarly, about 70 strands 98 are used when the resin is extremely thin.

Figure 8:
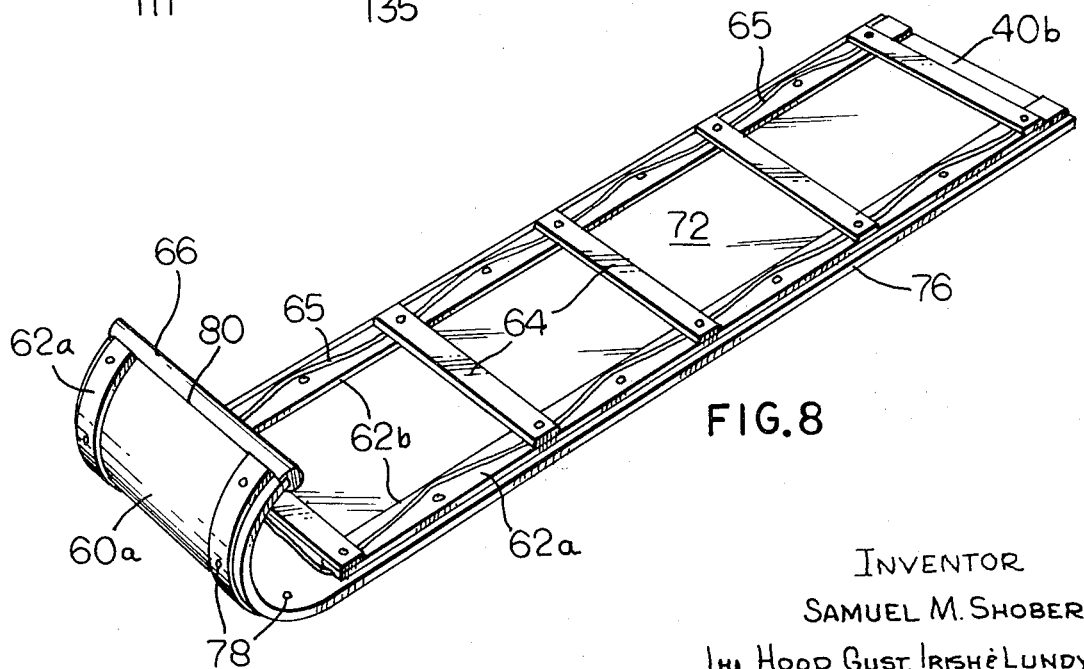
FIG. 8 is a perspective view of a modified version of the toboggan of the invention.

Now referring to FIG. 8, there is shown a second embodiment 60a of the toboggan of the invention. This second embodiment 60a is identical with the embodiment 60 illustrated in FIG. 5 in many respects. Thus, all like elements will be given like reference numerals. The only differences between the embodiments 60 and 60a of the improved toboggan of this invention reside in the strips 62. The embodiment 60a comprises strips 62a and 62b rather than the strips 62 shown in FIG. 5.

Strips 62a differ from the strips 62 only in that they are made of reinforced resin material in accordance with the method above-described in relation to the apparatus shown in FIGS. 6 and 7. The strips 62a are mounted to the member 40b in an identical manner as that above-described.

Strips 62b are identical to strips 62 except that the curved portions 70 thereof are deleted therefrom. Thus in a specific embodiment, strips 62b are made of wood, smoothly finished and highly polished as above-described. The strips 62b are secured to the strips 62a and to the member 40b in a manner identical with that above-described. In all other respects, the toboggan embodiments 60 and 60a are identical.

The above-described method by which the strips 62, 62a 62b, and 64 are secured to the member 40b is critical. Heretofore, the strips 62 and 64 were secured to member 40b by the same rivets. These rivets extended through the member 64, the first-mentioned pair of strips 62, the member 40b, and the second-mentioned pair of strips 62. This method of attachment of the strips 62 and 64 to the member 40b did not prove satisfactory for the reason that the strips 62 and 64 became loose during use due to rivet failure. The above-mentioned and preferred method for securing the strips 62 and 64 to the member 40b provides a toboggan which does not have this defect. A toboggan made in accordance with this preferred method has the durability of conventional toboggans.

While there have been described above the principles of this invention in connection with specific apparatus, it is to be clearly understood that this description is made only by way of example and not as a limitation to the scope of the invention.

What is claimed is:

1. A method of fabricating fiber-reinforced resin articles comprising the steps of wetting a plurality of sheets of fiber-reinforced cloth material with a hardenable liquid resin, superposing said cloth sheets, each of said cloth sheets being in contact with the next adjacent of said cloth sheets, urging said sheets together and said resin into the interstitial spaces in and between said cloth sheets, controlling the quantity of resin on said cloth sheets and wiping the excess resin therefrom, placing said cloth sheets between two sheets of material which are impervious to said resin said impervious sheets being larger than the composite size of said cloth sheets, said cloth sheets being enclosed in said impervious sheets, placing said impervious sheets with said cloth sheets therein in a mold, molding said cloth sheets to the shape of a desired article, said molding step including the steps of partially curing said resin, removing said cloth sheets from between said impervious sheets, cutting said article to the desired size and shape, and completely curing said resin.

2. The method of claim 1 wherein said impervious material is flexible material, wherein said molding step includes the step of urging said cloth sheets wet with resin against one of said impervious sheets, and further comprising the steps of laying the other of said impervious sheets over said cloth sheets prior to said molding step, said last-mentioned impervious sheet being a part of said mold.

3. The method of claim 1 wherein said resin is a heat-hardenable resin and wherein said partially curing step includes the step of applying heat and pressure to said article simultaneously.

4. The method of claim 3 wherein said applying step comprises the step of pressing said article.

5. The method of claim 1 wherein said wetting step and said placing step comprises the step of simultaneously drawing said sheets from continuous sheets stored on storage rolls.

6. The method of claim 5 wherein said impervious material is polyethylene terephthalate.

7. The method of claim 5 wherein said material is flexible material, and further comprising the step of backing said sheet with a rigid member prior to said molding step.

8. The method of claim 1 wherein said mold is rigid and provided with a mold opening, and further comprises the steps of laying one of said impervious sheets over said mold opening, placing said sheet in tension and forming a seal between said impervious sheet and the portions of said mold surrounding said mold opening thereby closing said mold.

* * * * *